(12) United States Patent
Dimic et al.

(10) Patent No.: US 12,743,713 B2
(45) Date of Patent: Sep. 22, 2026

(54) DATA GATHERING FOR STORE FIXTURES AND THE PRODUCTS THEREIN

(71) Applicant: Unefi Inc., Toronto (CA)

(72) Inventors: Ranko Dimic, Toronto (CA); Samuel Arthur Vise, Toronto (CA); Tibor Szanto, Toronto (CA)

(73) Assignee: Unefi Inc., Toronto (CA)

( * ) Notice: Subject to any disclaimer, the term of this patent is extended or adjusted under 35 U.S.C. 154(b) by 0 days.

(21) Appl. No.: 18/834,764

(22) PCT Filed: Dec. 13, 2022

(86) PCT No.: PCT/CA2022/051814
§ 371 (c)(1),
(2) Date: Jul. 31, 2024

(87) PCT Pub. No.: WO2023/141696
PCT Pub. Date: Aug. 3, 2023

(65) Prior Publication Data
US 2025/0156895 A1 May 15, 2025

Related U.S. Application Data

(60) Provisional application No. 63/304,874, filed on Jan. 31, 2022.

(51) Int. Cl.
*G06Q 30/0601* (2023.01)
*G06Q 30/0242* (2023.01)
*G06T 7/00* (2017.01)

(52) U.S. Cl.
CPC ..... *G06Q 30/0242* (2013.01); *G06Q 30/0639* (2013.01); *G06T 7/0002* (2013.01); *G06T 2207/30242* (2013.01)

(58) Field of Classification Search
CPC .. G06Q 30/0207–0277; G06Q 30/0639; G06T 7/0002; G06T 2207/30242
(Continued)

(56) References Cited

U.S. PATENT DOCUMENTS

2008/0306787 A1* 12/2008 Hamilton ........... G06Q 10/0639 705/7.38
2013/0076726 A1 3/2013 Ferrara et al.
(Continued)

FOREIGN PATENT DOCUMENTS

WO 2022221935 A1 10/2022

OTHER PUBLICATIONS

Scannow, "Affordable & easy mobile inventory scanning", retrieved from https://www.acepos-solutions.com/scannow, available on Feb. 23, 2018 (Year: 2018).*
(Continued)

*Primary Examiner* — Sam Refai
(74) *Attorney, Agent, or Firm* — Volpe Koenig

(57) ABSTRACT

Systems and methods for gathering data regarding a specific fixture and the products displayed on that fixture. A user is guided towards the specific fixture and is directed to take images of the fixture as well as of specific products displayed on that fixture. Data regarding one or more of these products is also gathered from the user. The images taken as well as the data gathered are then uploaded to a remote server for processing. These images and the data may be crowdsourced to spread the effort required to gather the data.

1 Claim, 5 Drawing Sheets

(58) Field of Classification Search
USPC .............................................. 705/14.1–14.73
See application file for complete search history.

(56) References Cited

U.S. PATENT DOCUMENTS

| | | | | |
|---|---|---|---|---|
| 2017/0011498 | A1* | 1/2017 | Yu | G06T 7/001 |
| 2017/0103515 | A1 | 4/2017 | Huluth | |
| 2017/0286773 | A1 | 10/2017 | Skaff et al. | |
| 2017/0308764 | A1 | 10/2017 | Higa | |
| 2018/0247264 | A1* | 8/2018 | Taylor | G06Q 10/047 |
| 2021/0374642 | A1* | 12/2021 | Bronicki | G06Q 10/06395 |
| 2021/0398407 | A1* | 12/2021 | Adato | G06V 20/52 |
| 2022/0180551 | A1* | 6/2022 | Lui | G06Q 30/0643 |

OTHER PUBLICATIONS

International Search Report and the Written Opinion of the International Searching Authority for PCT App. No. PCT/CA2022/051814, of which the present Application is a National Phase Entry under 35 USC 371. Mailed Mar. 14, 2023, 14 pages.

* cited by examiner

DATA GATHERING FOR STORE FIXTURES AND THE PRODUCTS THEREIN

TECHNICAL FIELD

The present invention relates to the field of data gathering. More specifically, the present invention relates to systems and methods for gathering data related to one or more products displayed on specific fixtures at retail establishments.

BACKGROUND

In today's competitive retail market, multiple products are constantly battling for a share of sales. To this end, some manufacturers and/or distributors cut deals with retailers to ensure that the products of the manufacturers/distributors are given suitable shelf space and visibility for the consumer.

As an example, some deals may obligate a retailer to display certain products at the front of shelves. Similarly, other deals may obligate retailers to give other products a specific percentage of the frontage of a shelf (e.g., 25% of a consumer facing front of a shelf).

While such deals may provide specific products with an advantage, this would only be true if the retailer kept up their end of the bargain. To this end, the only way for manufacturers/distributors to keep retailers honest is to constantly check the retailers shelves. As can be imagined, this may be an onerous and daunting task, especially as some retailers have hundreds of stores spread out across the country. Not only is the sheer size of the task daunting but the person checking on the retailer would only need to check a few shelves or fixtures per store. As well, for each fixture being checked, the presence (or absence) of each product would have to be confirmed and the amount of shelf or fixture space being occupied by each product would need to be calculated. As can be imagined, this can be a thankless task.

There is therefore a need for systems and methods that can automate at least some aspects of the above. Preferably, users quickly gather the raw data necessary to determine whether a retailer is conforming to its agreements and that data is processed elsewhere. In addition, preferably, any solution should be easy to use and accessible to a broad range of users.

SUMMARY

The present invention provides systems and methods for gathering data regarding a specific fixture and the products displayed on that fixture. A user is guided towards the specific fixture and is directed to take images of the fixture as well as of specific products displayed on that fixture. Data regarding one or more of these products is also gathered from the user. The images taken as well as the data gathered are then uploaded to a remote server for processing. These images and the data may be crowdsourced to spread the effort required to gather the data.

In a first aspect, the present invention provides a method for gathering data relating to at least one product displayed on a store fixture, the method comprising:

a) prompting a user to take a fixture image of a specific fixture using a portable user device;
b) receiving, at said user device, said fixture image of said specific fixture;
c) prompting said user to take a product image of a specific product expected to be displayed on said specific fixture;
d) receiving, at said user device, said product image;
e) prompting said user to enter details regarding said specific product;
f) receiving, at said user device, said details from said user
g) sending said details and said fixture image and said product image to a data processing device for processing.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
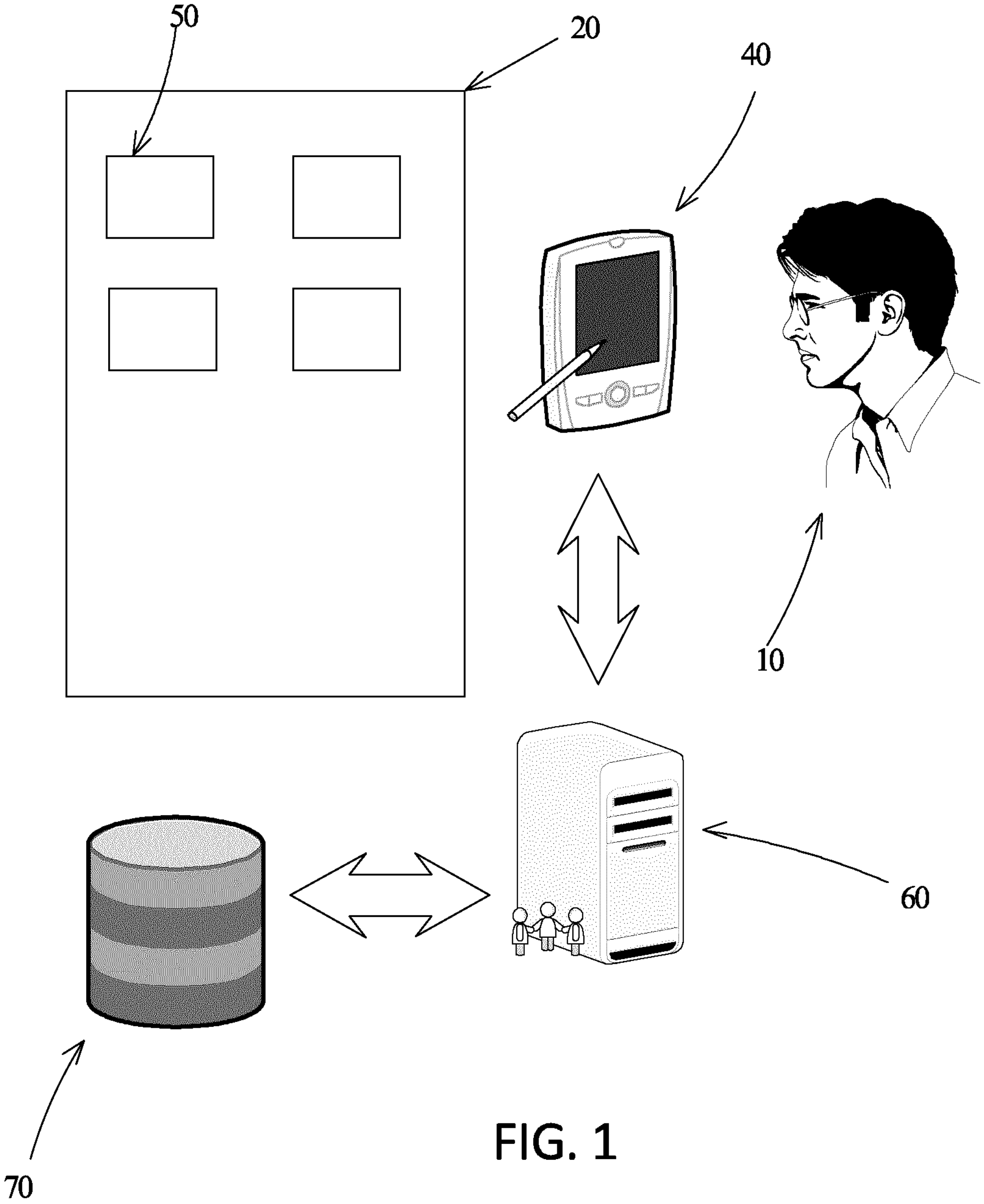
FIG. 1 is a schematic diagram illustrating the components involved in one aspect of the present invention.

In one aspect, the present invention relates to systems and methods for gathering data relating to one or more products as displayed on a fixture/shelf in a retail establishment. By way of an app installed on a user's mobile device, the user is directed to a specific fixture at a retail establishment. The user is then directed to take an image (a fixture image) of the fixture. Once a suitable image has been taken and the fixture image has been uploaded, the user is then prompted to take an image of a specific product that is expected to be on the specific fixture. After the image of the product has been taken and uploaded, the user is then queried as to how many of that product is present (and facing the user) on the specific fixture. Once all those images have been uploaded and the details about the product has been collected from the user, the app can then focus on another product on the same shelf.

It should be clear that the user may be directed to the specific fixture using any number of methods. As an example, the retail establishment's address may be provided and specific directions to the specific fixture may also be provided once the user has entered the retail establishment. Similarly, the specific fixture's location in the retail establishment may be provided (e.g. southwest corner of the retail establishment) or, for retail establishments that number their fixtures or their aisles, the aisle number may be provided (e.g. end shelf on the east side of aisle 5 facing south). Alternatively, the user may be provided with an artificial mockup of the expected fixture configuration (a planogram) of the specific fixture. The user can then be directed to search for a fixture that looks most similar, in terms of product configuration and placement, to the provided planogram. Of course, the planogram would be presented to the user using the user device's screen.

To ensure that the image taken by the user is suitable for image recognition and image processing, the user may be presented with a frame using the camera module in the user device. The user can then be instructed to ensure that the fixture image seen by the user is centered within and inside of the frame prior to taking the image/photo. Such a measure may assist in ensuring that the resulting fixture image is suitable for processing by ensuring that the resulting image has sufficient resolution and size to be properly processed. Of course, the size of the frame provided to the user may be automatically adjusted by the app depending on the detected capabilities of the user device's on-board camera.

As an alternative to providing the user with a frame in which to fit the image being viewed by the user prior to taking the photo, the user may be directed to be within a specific distance from the specific fixture. As an example, the user may be instructed to be between 5 and 6 feet away from the specific fixture to ensure that the fixture fits in a single image taken by the user device camera.

Once the user has taken the fixture image of the specific fixture, the fixture image can be uploaded to a database or it can be processed on the user device. Whether the fixture image is uploaded or processed on the user device may depend on the capabilities of the user device. The app may be preconfigured to either process or upload the image based on the user device's detected capabilities.

After the user has taken the fixture image, the app can then focus on a single product that is expected to be on the specific fixture. An image of the specific product can be retrieved and presented to the user using the user device or, alternatively, the app can process the fixture image and select one of the products illustrated in the fixture image. The selected product in the fixture image can then be enlarged and provided to the user as the image of the specific product to be focused on.

Once an image of the specific product has been presented to the user, the user is prompted to take an image of the same product as displayed on the specific fixture. This image taken by the user can serve as confirmation that the specific product is present on the specific fixture. Of course, the image taken by the user would be compared to a stored image of the specific product to ensure that the expected product is the same product that the user has taken an image of.

At the same time that the user is presented with an image of the specific product to be imaged, the user can also be prompted to provide details regarding that specific product. Details such as product quantity, product visibility product placement (e.g., is the product at the front or the back of the fixture?), product proximity to other products (e.g., is the product adjacent to similar other competing products?) can be queried from the user. Or, alternatively, the user may be queried as to how many of the specific product on the specific fixture is front facing and visible to the user/other consumers (e.g. how many instances of the specific product is completely and fully visible to the user such that the complete packaging of the product is visible to the user).

After the image of the specific product has been uploaded and after the details about the specific product have been received from the user, the app can focus on another specific product that is expected to be on the specific fixture. Alternatively, if there are no more products to be focused on, the app can direct the user to a different specific fixture as necessary.

It should be clear that the data gathered as explained above should be sufficient to perform calculations and to make determinations regarding the specific product that has been the focus of the data gathering. As an example, since the system that the app uploads the data to has access to the physical dimensions of the specific fixture as well as the dimensions of the packaging of the specific product focused on, the system can determine the square footage or front area of the specific fixture. Also, the system can determine how much of that front area is occupied by the specific product by determining the front area of the specific product's packaging and then multiplying that product front area by the number of specific product that is front facing. This is then compared with the total front area of the specific fixture to result in the percentage of the front area of the specific fixture that is occupied by the specific product.

It should also be clear that the actual characteristics of the specific fixture can be compared with the expected characteristics of the planogram. As an example, if the planogram has a total front area of 38 square feet and is shown to have 10 instances of the specific product (and with each instance of the specific product having a front area of 2 square feet) then the expected front area occupancy is 52%. This comes from the total front area of 10 instances of the specific product resulting in a front area of 20 square feet. 20 square feet out of a total front area of 38 square feet for the specific fixture results in an occupancy of 52%. However, if the user has seen (and entered) only 8 instances of the specific product on the actual specific fixture, then the specific product only occupies 16 square feet. Thus, the real life specific fixture (in the so-called realgram) only has a 42% occupancy for the specific product.

As another feature of the present invention, the products displayed on the real life specific fixture can be compared to the expected products on the planogram. By sequentially focusing on different products that are displayed on the specific fixture, the data regarding each of those products can be gathered for the system. And, using that data and the data stored on the system about the specific fixture (e.g., the dimensions of the specific fixture), determinations can be made regarding the different products in relation to the specific fixture. As an example, the total occupancy of the front area for each product can be determined using the process as explained above. As well, the realgram configuration for each product can be compared with the expected configuration from the planogram. It should be noted that the comparison between the planogram and the realgram is not performed on a fixture as a whole but is, rather, performed on a per product basis. That is, the configuration for product A in the planogram is compared with the configuration for product A in the realgram to determine whether, for that product, the expected configuration is found in the realgram. As an example, the planogram may have 5 instances of product A in the specific fixture but the realgram (the image of the specific fixture) only shows 3 instances of product A. This would indicate that the real life specific fixture is only 60% compliant with the expected configuration relative to product A.

It should be clear that the data for the realgram (or the real life specific fixture) may be derived from the image of the specific fixture (e.g. using image recognition to detect, isolate, and count each specific product on the specific fixture) or the data may be derived from what the user has entered in terms of details for each of the displayed products. Thus, the system may detect and count how many instances there are of product A on the specific fixture or the system may take its data from what the user has entered in terms of quantity of product A on the specific fixture. Or, alternatively, the system may accept the user's data entry and then verify that data using the fixture image uploaded by the user.

Once all the products to be checked/focused on in the specific fixture have been imaged, checked, and their quantities (or at least the front facing products), the system may generate reports that detail the determinations made regarding the products and/or the specific fixture. These reports can be sent to the relevant parties as necessary.

As noted above, checking on multiple retail establishments may be difficult and onerous. However, the task may be made more manageable by using crowdsourcing such that users in different areas of a country can visit different retail establishments as necessary. The app can be installed on their mobile devices and the app can, by working in conjunction with the mobile device's location/GPS module, determine which retail establishment is nearby that still needs to have its fixtures checked. In addition, the app can download whatever images, planograms, or data may be needed for the user to accomplish the data gathering task. As relevant data is gathered by the app, this data is uploaded to the system and specific fixtures in specific locations of specific retail establishments can be assessed in terms of expected configurations using stored planograms in the system. Of course, different retail establishments and different locations may have different planograms associated with different locations. The system would have different suitable planograms stored and associated with the different retail establishments at the different locations as necessary.

Referring to the Figures, FIG. 1 schematically illustrates one aspect of the invention. As can be seen, a user 10 is directed to a specific fixture 20 in a retail establishment. There, the user is prompted by a user device 40 to take a fixture image of the specific fixture 20. As well, the user 10 is directed to take a product image of a product 50 displayed on the specific fixture 20. The user is also queried to provide at least some data regarding that product 50. The data and the fixture image and the product image are uploaded to a server 60 for storage and processing. The server 60 may retrieve images and/or data from a database 70 for presentation to the user 10 as the user is prompted for the images and/or the data.

Figure 2:
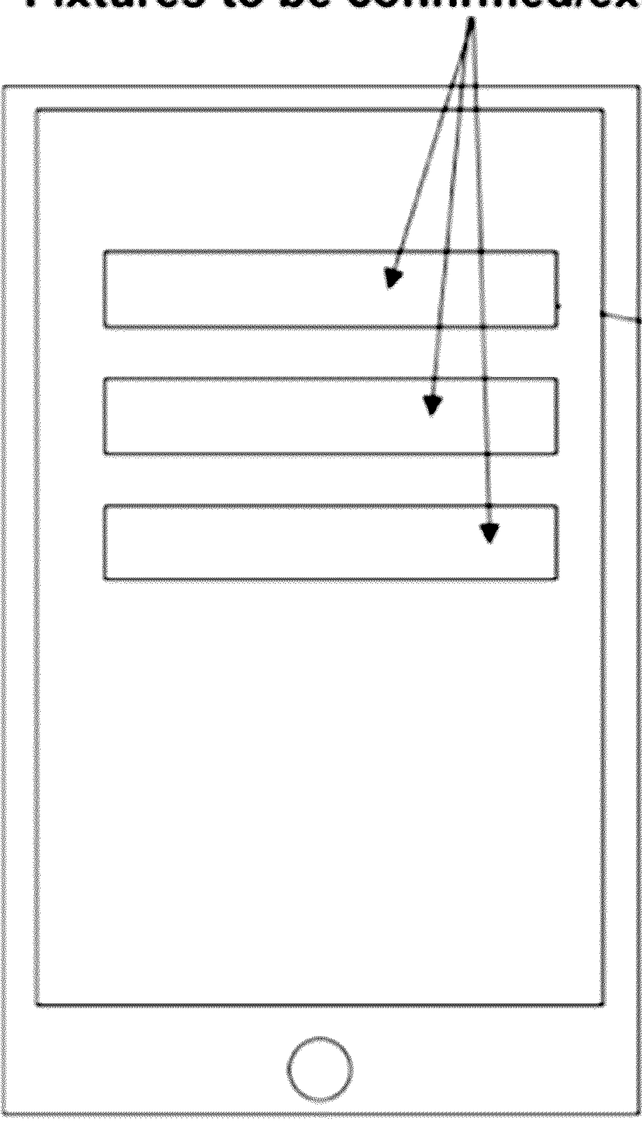
FIG. 2 is a sample screenshot of a listing of fixtures for which data regarding products are to be gathered.

Referring to FIG. 2, a sample schematic screen shot of a listing of fixtures to the checked is illustrated. The listing includes different entries 100 for each fixture to be checked. Each of these fixtures may be at a different location and the user may be provided with specific directions to locate each of these fixtures. As can be imagined, the listing is provided by way of the user device 40.

Figure 3:
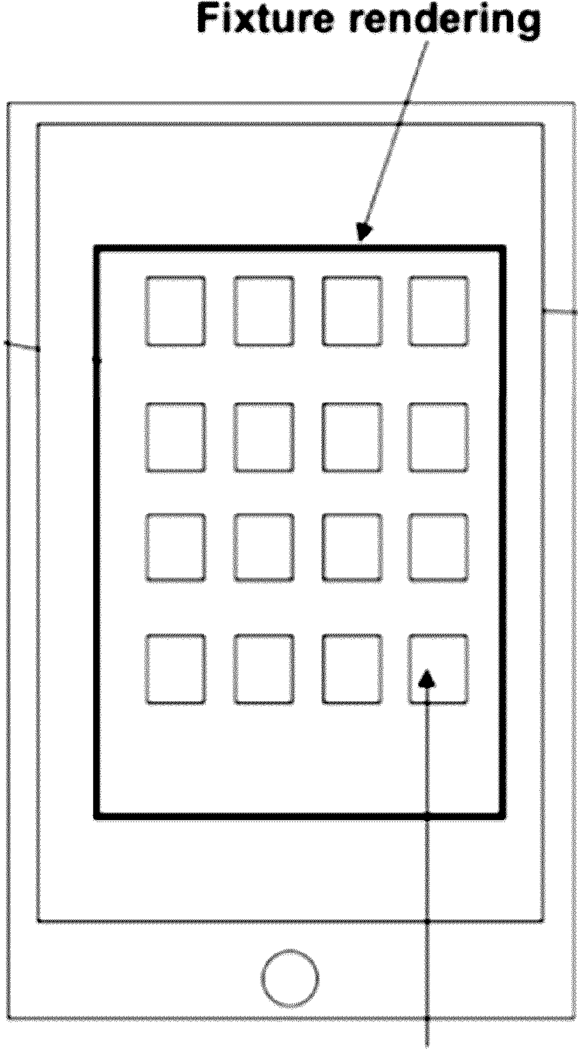
FIG. 3 is an example screenshot showing a planogram presented to a user as a guide to locating the specific fixture to be imaged.

Referring to FIG. 3, a sample planogram on a user device screen is illustrated. As noted above, one way to direct the user to the specific fixture is to show the user a planogram of the specific fixture so that the user can search for the fixture that has the configuration of products on the fixture as similar as possible to the planogram. The planogram may also be used as confirmation to the user that the specific fixture that is to be the focus of the data gathering is, indeed, in front of the user. As can be seen from FIG. 3, the planogram may have multiple products illustrated as being on display on the fixture. The multiple products may be displayed on the planogram in a specific configuration. As should be clear, the planogram may be retrieved by the server from the database and provided to the user device for presentation to the user.

Figure 4:
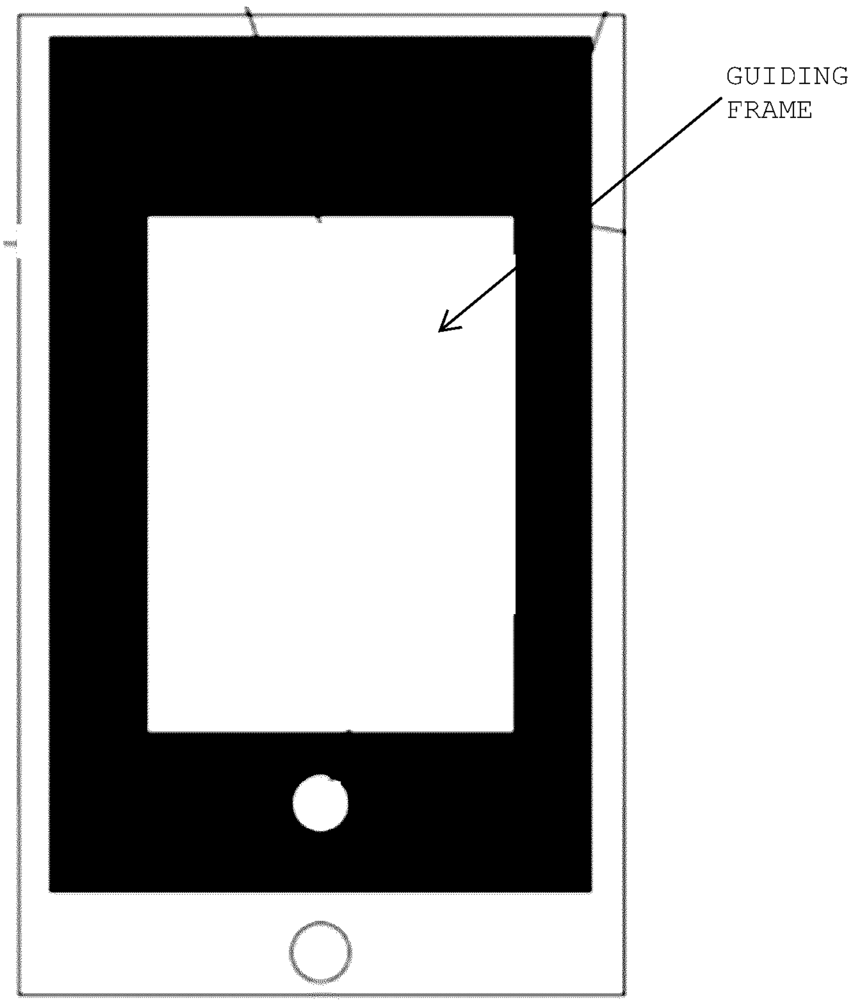
FIG. 4 is a sample screenshot showing a frame for guiding the user when taking a fixture image of a specific fixture.

Referring to FIG. 4, a screenshot of a frame on the user device is illustrated. As explained above, when the user is prompted to take a fixture image of the specific fixture, the user may be provided with a frame on the user device. The user is then directed to use the frame as a guide to taking the fixture image such that (as much as possible) the fixture is inside and within (and aligned with) the frame prior to taking the fixture image. This ensures that the fixture image has suitable resolution for processing by the server. This also ensures that the resulting fixture image is properly aligned and oriented (i.e. upright) for proper processing. If the user is not provided with the guiding frame, the resulting fixture image may be misaligned or have insufficient resolution (i.e., the user is too far from the fixture) for proper processing. Alternatively, the user may be too close to the fixture and the resulting fixture image does not encompass all of the fixture. The frame or guiding frame ensures that the relevant area of the specific fixture is in the fixture image.

Figure 5:
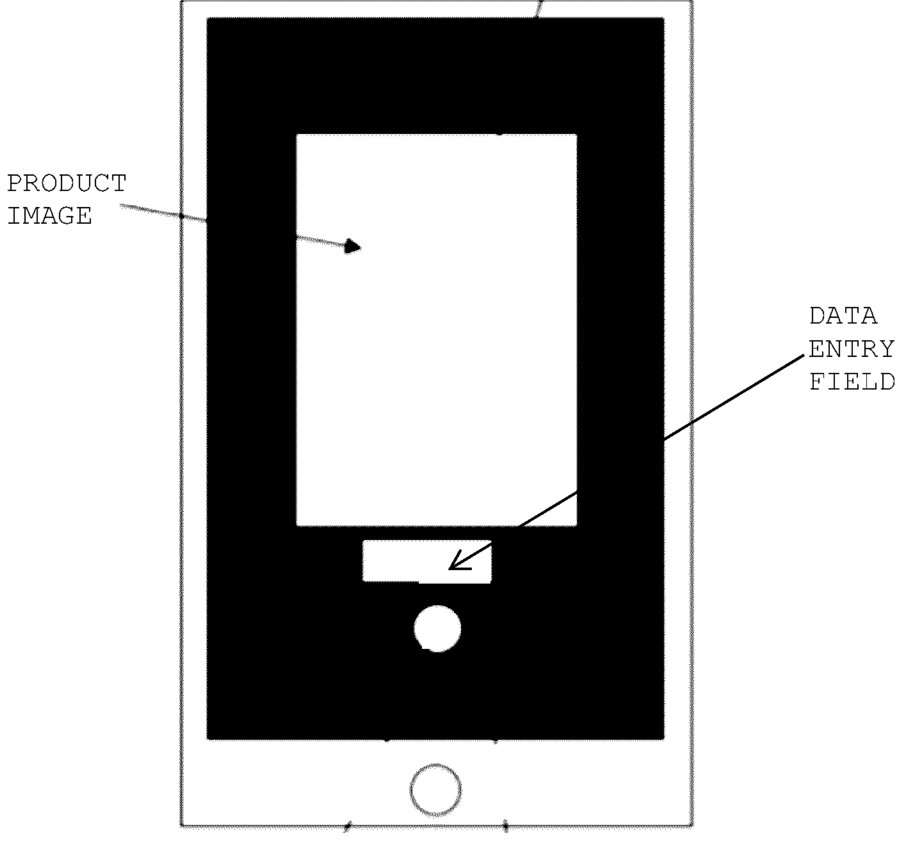
FIG. 5 is a screenshot of a sample user interface for presenting a product image to a user and for gathering data from the user about the product.

Referring to FIG. 5, a screen shot of the user interface for a product image is illustrated. After the user has taken a fixture image, one of the products is highlighted as the focus for the user. In one implementation, one of the products shown in the fixture image is selected and zoomed in on by the user device. The image is then presented to the user and the user is prompted to take an image of that same product. This operates as a confirmation for the server that the user has actually viewed/seen the product and the product image is processed by the server (i.e. using a suitable image recognition process) to ensure that the user has indeed taken an image of the relevant product.

As can be seen from FIG. 5, part of the user interface is an area where the user can enter how many instances of that product (whose image was segmented and taken from the fixture image) is front facing and visible to the user. This data can then be used by the server for calculating statistics regarding the product as well as for producing suitable reports regarding the product and/or the specific fixture. As noted above, the product image, the fixture image, and the data entered by the user is uploaded to the server. It should be clear that other data may be queried from the user as necessary and as desired.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method of enlarging a section of an image, the section of the image displaying an item of interest, and the method comprising:

(a) prompting a user of a mobile device to capture an image of a fixture containing a plurality of products, wherein one of said plurality of products is the item of interest, and the prompting being by way of a prompt displayed at a display interface of the mobile device;

(b) responsive to the user opening a camera interface of the mobile device in response to the prompt and the user aiming the camera towards the fixture, displaying on the camera interface a frame positioned around the fixture;

(c) detecting capabilities of the camera of the mobile device;

(d) automatically adjusting a size of the frame displayed to the user based on the capabilities detected in (c);

(e) instructing the user to adjust a position of the mobile device to thereby position and align an image of the fixture within the frame;

(f) capturing the image of the fixture at the mobile device;

(g) displaying the image on said display interface;

(h) automatically analyzing the image, using an image recognition process at the mobile device, to identify the section of the image that contains the item of interest in said image;

(i) automatically enlarging the section of the image to thereby product a second image, the second image being exclusively an image of the item of interest; and (j) displaying the second image on the display interface;

(k) further comprising receiving, at the mobile device, a further image captured by the user, the further image being a closer image of the item of interest on the store fixture; and (l) further comprising comparing the second image and the further image to thereby verify that the item of interest was correctly captured in the second image and the further image.

* * * * *